(No Model.) 2 Sheets—Sheet 1.

W. RAILTON & R. CAMPBELL.
FILTER.

No. 555,020. Patented Feb. 18, 1896.

FIG. I.

(No Model.) 2 Sheets—Sheet 2.

W. RAILTON & R. CAMPBELL.
FILTER.

No. 555,020. Patented Feb. 18, 1896.

Witnesses
H. E. Shepard
K. E. Naumann

William Railton,
Richard Campbell,
Inventors
by J. R. Littell,
Attorney.

UNITED STATES PATENT OFFICE.

WILLIAM RAILTON AND RICHARD CAMPBELL, OF LIVERPOOL, ENGLAND.

FILTER.

SPECIFICATION forming part of Letters Patent No. 555,020, dated February 18, 1896.

Application filed April 30, 1894. Serial No. 509,574. (No model.)

*To all whom it may concern:*

Be it known that we, WILLIAM RAILTON and RICHARD CAMPBELL, engineers, subjects of the Queen of Great Britain, residing at Liverpool, in the county of Lancaster, in the Kingdom of England, have invented certain new and useful Improvements in Filters, of which the following is a specification.

This invention relates to apparatus for filtering and purifying water to make it suitable for feeding steam-boilers or for drinking or cooking purposes. It is designed to provide a large filtering area, while not increasing the space taken up by the apparatus.

The accompanying drawings show the invention as applied to marine feed-water filters, in which—

Figure 1:
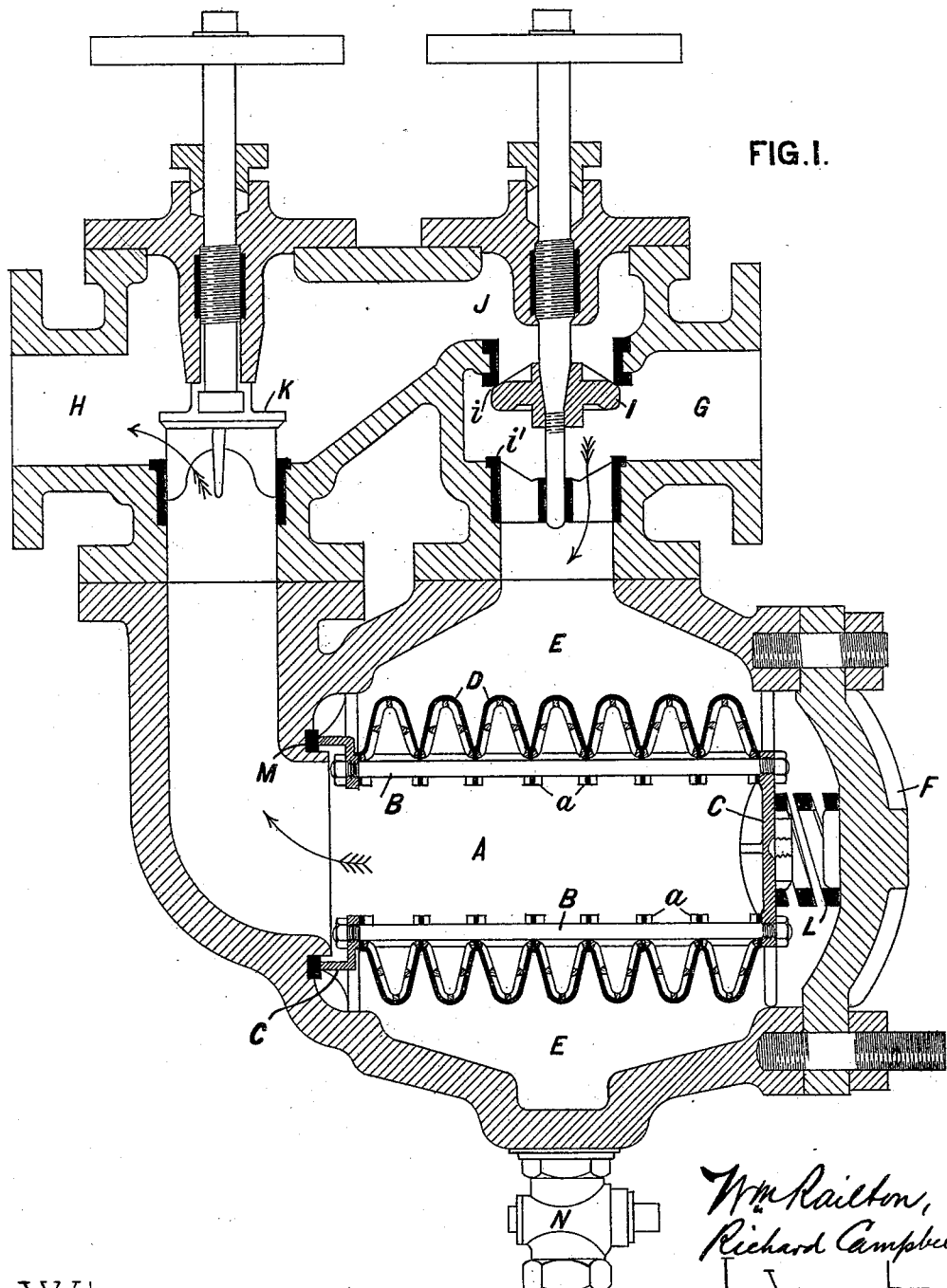
Figure 2:
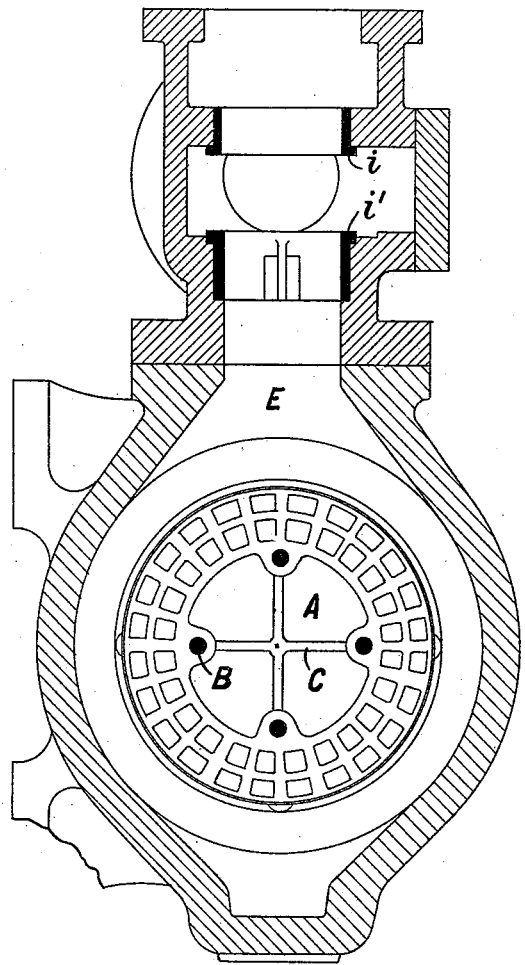
Figure 3:
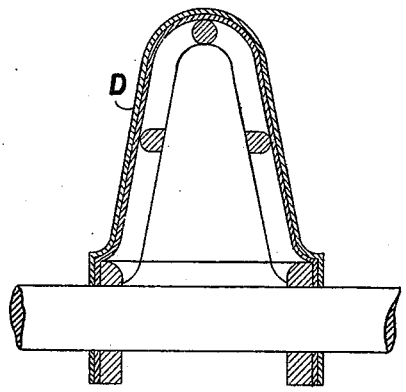
Figure 4:
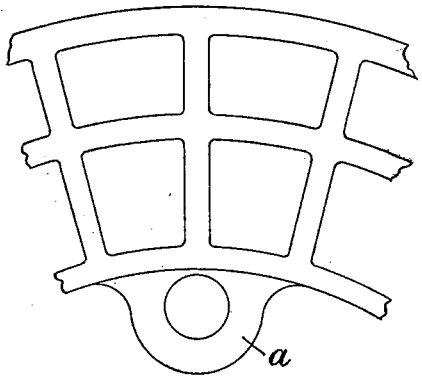

Figure 1 is a sectional elevation; Fig. 2, a cross-section; Fig. 3, a section through one of the corrugations; and Fig. 4, a side view of the corrugations, showing gratings or perforations.

By our invention we form the filtering and purifying surfaces of a series of perforated corrugations, whereby the filtering area is much greater than if made without corrugations in the ordinary way.

A is a corrugated filtering-chamber, the corrugations of which are perforated with openings of any suitable size or shape, so as to form a grating through which water can pass. This chamber may be made in one piece, or, if preferred, in sections or rings $a$, as shown in the drawings, Figs. 1 and 3, these corrugated sections or rings being bolted together by stay-bolts B passing through the flanges $a'$ and end pieces C.

D are the filtering-flannels or other suitable filtering media, which completely cover each grating, and the edges of which are clipped between the flanges $a'$ of the sections when the latter are bolted together, the stay-rods B also passing through the flannels, so that the latter cannot possibly come off.

When the chamber A is made in one piece, a single sheet of filtering material may be employed, which conforms to the shape of the chamber and may be tied to the corrugations by tape or in any other suitable manner.

E is a chest which receives the filter-chamber, the lower portion of which is constructed to form a dirt-collector; F, a movable door bolted to one end; G, the inlet-pipe for the feed-water; H, the outlet-pipe; I, a twin valve with twin seatings $i$ and $i'$ for controlling both the inlet-pipe G and the branch J; K, a valve for controlling the outlet-pipe H; L, a spiral spring mounted between the removable door F and chamber A and adapted to keep the latter pressed against the seating M, so that the water cannot penetrate into the delivery side of the filter without penetrating the filtering-flannels D; N, a drain-cock for enabling impurities collecting in the chest E to be ejected.

An air-cock (not shown) may be provided, if desired, in the chest E.

The filtering-chamber is supported in the manner shown or in any other suitable manner, so that the feed-water entering the chest E by the inlet-pipe G has to flow through the corrugations of the chamber A on its way to the outlet-pipe H.

The mode of action is as follows: The water under pressure entering through the inlet-pipe G percolates through the perforated corrugations into the hollow chamber A, leaving the dirt, grease, and other impurities behind on the filtering media, and the purified water is delivered through the outlet-pipe H. The dirt that settles in the chamber A will gravitate by its own accord to the bottom of the chest E, and when the sludge-cock N is opened and the valve K closed the feed-water entering the apparatus will flow through it without passing into the boiler, effectually ejecting the dirty water and sludge through the said cock. Should the filtering-flannel become considerably contaminated and require renewal, the valve I is closed on its lower seat, $i'$, and the valve H is closed. The filtering apparatus is thus entirely cut off and the water passes direct to the boiler without passing through the filter at all. The movable door F can then be taken off and the filtering-cage A taken out of the chest and new flannels put in.

We have described one way in which our invention may be carried into effect; but it is obvious that the invention is capable of application to almost any kind of filter, the special arrangement of apparatus herein described and shown being given merely by way of example; also, that the corrugated filtering or purifying surfaces may be made in the shape of concentric cylinders, concentric cones, or simply of corrugated layers. It will likewise be obvious that the corrugations may be formed longitudinally, spirally, or in any other suitable manner. The method of using the filter may of course be reversed, and the purified water led in through the hollow chamber A and out through the valve I.

We do not herein claim the twin valve *per se*, the same forming the subject-matter of a separate application for patent filed September 5, 1895, Serial No. 561,566.

We declare that what we claim is—

1. As an improvement in filtering apparatus, a filtering-chamber formed of perforated corrugated sections or rings secured together and forming collectively the outer wall of said filtering-chamber, substantially as and for the purpose set forth.

2. As an improvement in filtering apparatus, a filtering-chamber formed of perforated corrugated sections or rings provided with flanges through which pass longitudinal stay-bolts, B, by which the perforated corrugated sections or rings are secured together and collectively form the outer wall of the filtering-chamber, substantially as and for the purpose set forth.

3. An improved filtering apparatus, embodying a filtering-chamber formed of the perforated corrugated sections or rings having flanges, the end pieces C C, longitudinal stay-bolts B passing through said flanges and end pieces, the seating M against which one set of end pieces C rest, and tightening devices for forcing the filtering-chamber against said seating, substantially as and for the purpose set forth.

4. An improved filtering apparatus, embodying the perforated corrugated sections or rings forming the filtering-chamber A, the filtering-flannels or other filtering media D covering each corrugation, and the stay-bolts securing the parts together, substantially as set forth.

5. An improved filtering apparatus, embodying perforated sections or rings provided with flanges and collectively forming the filtering-chamber, flannels or other suitable filtering media covering said perforated sections and having the edges clipped between the flanges of the adjoining sections or rings, and bolts passing through said flanges for securing the sections or rings together and binding the covering or filtering media in position, substantially as set forth.

In testimony whereof we have signed our names to this specification in the presence of two subscribing witnesses.

WILLIAM RAILTON.
    RICHARD CAMPBELL.

Witnesses:
 G. C. DYMOND,
 H. P. SHOOBRIDGE.